(12) United States Patent
Kobayashi et al.

(10) Patent No.: US 12,522,519 B2
(45) Date of Patent: Jan. 13, 2026

(54) FILTER, METAL ION REMOVAL METHOD, AND METAL ION REMOVAL DEVICE

(71) Applicant: Solventum Intellectual Properties Company, Maplewood, MN (US)

(72) Inventors: Mitsuaki Kobayashi, Tokyo (JP); Yukihisa Okada, Tokyo (JP)

(73) Assignee: THERMO FISHER BIOPROCESSING INC., Waltham, MA (US)

( * ) Notice: Subject to any disclaimer, the term of this patent is extended or adjusted under 35 U.S.C. 154(b) by 591 days.

(21) Appl. No.: 17/775,496

(22) PCT Filed: Nov. 23, 2020

(86) PCT No.: PCT/IB2020/061054
§ 371 (c)(1),
(2) Date: May 9, 2022

(87) PCT Pub. No.: WO2021/105858
PCT Pub. Date: Jun. 3, 2021

(65) Prior Publication Data
US 2022/0388872 A1 Dec. 8, 2022

(30) Foreign Application Priority Data
Nov. 28, 2019 (JP) .................................. 2019-215338

(51) Int. Cl.
*C02F 1/28* (2023.01)
*C02F 101/12* (2006.01)
*C02F 101/20* (2006.01)

(52) U.S. Cl.
CPC ................ *C02F 1/28* (2013.01); *C02F 1/283* (2013.01); *C02F 1/285* (2013.01);
(Continued)

(58) Field of Classification Search
CPC ............ C02F 1/28; C02F 1/283; C02F 1/285; C02F 2101/12; C02F 2101/20; C02F 2301/08;
(Continued)

(56) References Cited

U.S. PATENT DOCUMENTS

| | | |
|---|---|---|
| 7,112,272 B2 | 9/2006 | Hughes et al. |
| 10,688,411 B2 | 6/2020 | Kobayashi |
| 2020/0360915 A1 | 11/2020 | Kogawa et al. |
| 2021/0187422 A1 | 6/2021 | Kobayashi et al. |
| 2022/0388872 A1 | 12/2022 | Kobayashi et al. |

FOREIGN PATENT DOCUMENTS

| | | |
|---|---|---|
| CN | 114761122 A | 7/2022 |
| JP | 2000263040 A | 9/2000 |

(Continued)

OTHER PUBLICATIONS

International Search Report for PCT Application No. PCT/IB2020/061054, mailed on Jan. 26, 2021, 3 pages.

(Continued)

*Primary Examiner* — Terry K Cecil
(74) *Attorney, Agent, or Firm* — HYLTON-RODIC LAW PLLC

(57) ABSTRACT

A filter includes a porous molded article, which is a sintered material of mixed powder containing activated carbon powder and thermoplastic resin powder. When water having a specific electrical resistance value of 18 MΩ·cm or greater is caused to pass through the filter at a space velocity of 1200 $hr^{-1}$, a specific electrical resistance value of the water after being caused to pass through the filter is 13 MΩ·cm or greater. To provide a filter capable of efficiently removing metal ions in a treatment liquid and capable of easily obtaining a solution having an extremely low metal ion content.

8 Claims, 3 Drawing Sheets

(52) U.S. Cl.
CPC ...... *C02F 2101/12* (2013.01); *C02F 2101/20* (2013.01); *C02F 2301/08* (2013.01)

(58) Field of Classification Search
CPC ...... C02F 1/288; C02F 1/42; C02F 2101/103; C02F 2303/04; B01D 2239/10; B01D 2239/1241; B01D 39/1661; B01D 39/2062; B01J 20/28026; B01J 20/28042; B01J 20/3028; B01J 20/3042; B01J 20/3078; B01J 20/20; C01B 32/354
See application file for complete search history.

(56) References Cited

FOREIGN PATENT DOCUMENTS

| | | |
|---|---|---|
| JP | 2015024364 A | 2/2015 |
| JP | 2021084078 A | 6/2021 |
| KR | 20070028440 | 3/2007 |
| KR | 20090048928 A | 5/2009 |
| TW | 109141809 | 11/2020 |
| WO | 2019138305 A1 | 7/2019 |

OTHER PUBLICATIONS

CN 114761122 A, Patent Translate.
JP 2021084078 A, Patent Translate.
TW 109141809, Patent Translate.
KR 20090048928 A, Patent Translate.

FILTER, METAL ION REMOVAL METHOD, AND METAL ION REMOVAL DEVICE

CROSS REFERENCE TO RELATED APPLICATIONS

This application is a national stage filing under 35 U.S.C. 371 of PCT/IB2020/061054, filed Nov. 23, 2020, which claims the benefit of Japan Application No. 2019-215338, filed Nov. 28, 2019, the disclosure of which is incorporated by reference in its/their entirety herein.

TECHNICAL FIELD

The present disclose relates to a filter, a metal ion removal method, and a metal ion removal device.

BACKGROUND

A solution having a low metal ion content has hitherto been demanded as a solution used in manufacturing of an electronic component such as an integrated circuit. For example, Patent Document 1 (JP 2019118892 A) describes a metal compound removal device that reduces a metal content in a surfactant down to a ppb level that allows use in a high-performance semiconductor material.

SUMMARY

In recent years, electronic components have been becoming more and more elaborate. When the width of wiring is narrowed owing to such elaboration, even only subtle impurities may produce an adverse effect. For this reason, an allowable metal ion content of a solution for electronic component manufacturing has been more and more reduced, from an aspect of securing stability. For example, removal of metal ions down to a level even lower than a ppb level has been expected. However, with a known method, thorough reduction of a metal ion content may be difficult. In addition, a known method may have many work processes and thus may be inefficient.

An object of the present invention is to provide a filter capable of efficiently removing metal ions in a treatment liquid and capable of easily obtaining a solution having an extremely low metal ion content. Another object of the present invention is to provide a metal ion removal method and a metal ion removal device that use the above filter.

One aspect of the present invention relates to a filter including a porous molded article that is a sintered material of mixed powder containing activated carbon powder and thermoplastic resin powder. When water having a specific electrical resistance value of 18 MΩ·cm or greater is caused to pass through the filter at a space velocity of 1200 hr$^{-1}$, a specific electrical resistance value of water after being caused to pass through the filter is 13 MΩ·cm or greater.

The above filter is formed using a porous molded article that is a sintered material of mixed powder containing activated carbon powder and thermoplastic resin powder. Consequently, according to the above filter, metal ions in a treatment liquid can be efficiently removed.

In one aspect, a ratio $d_2/d_1$ of an average particle diameter $d_2$ of the activated carbon powder to an average particle diameter $d_1$ of the thermoplastic resin powder may be 10 or less. As a result, particles of the thermoplastic resin powder are more likely to be fused together, further improving uniformity, strength, and densification of the porous molded article.

In one aspect, the average particle diameter $d_2$ of the activated carbon powder may be 100 μm or less. As a result, the surface area of the activated carbon in the porous molded article increases, and thus the metal ions in the treatment liquid can be removed more efficiently. In addition, by reducing the average particle diameter $d_2$ of the activated carbon powder, the filter is easily affected by cleaning or the like, and a filter that satisfies the requirements of the specific electrical resistance value described above is more easily obtained.

Another aspect of the present invention relates to a removal method of metal ions in a treatment liquid, and the removal method includes a liquid-passing step of causing the treatment liquid to pass through the filter described above.

In one aspect, the liquid-passing step may include a first liquid-passing step of causing the treatment liquid to pass through a first filter, and a second liquid-passing step of causing the treatment liquid that has been subjected to the first liquid-passing step to pass through a second filter. The second filter may be the filter according to the one aspect of the present invention described above.

In the above aspect, the first filter may include a porous molded article that is a sintered material of mixed powder containing activated carbon powder and thermoplastic resin powder.

A still another aspect of the present invention relates to a metal ion removal device. The metal ion removal device includes a first filter; and a second filter configured to remove metal ions from a treatment liquid that has passed through the first filter, and the second filter is the filter according to the one aspect of the present invention described above.

In one aspect, the first filter may include a porous molded article that is a sintered material of mixed powder containing activated carbon powder and thermoplastic resin powder.

Advantageous Effects of Invention

According to the present invention, a filter that is capable of removing metal ions in a treatment liquid to easily obtain a solution having an extremely low metal ion content is provided. Further, according to the present disclosure, a metal ion removal device and a metal ion removal method that use the above filter are provided.

DETAILED DESCRIPTION

Figure 1:
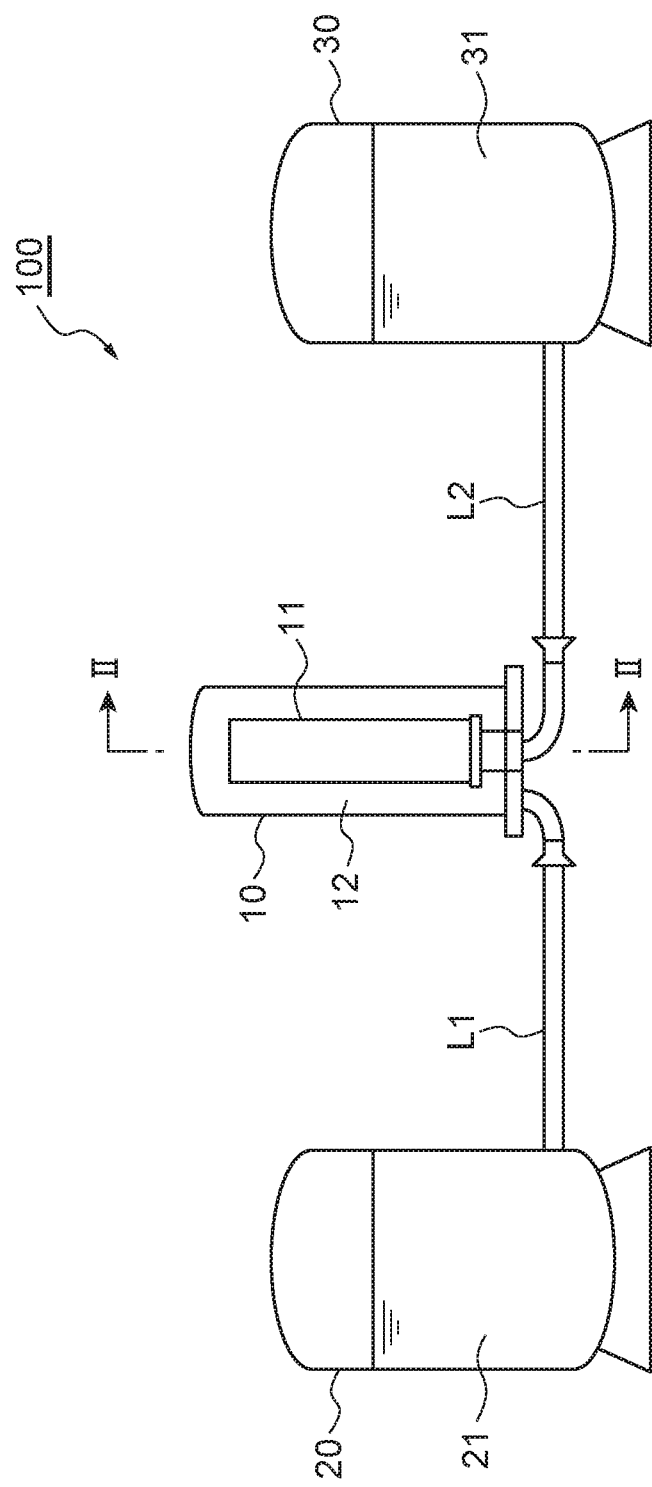
FIG. 1 is a diagram illustrating one embodiment of a metal ion removal device.

Preferred embodiments of the present invention are described below with reference to the drawings. Note that, for the sake of better understanding, a part of the drawings is illustrated with exaggeration, and a ratio of dimensions or the like is not limited to that illustrated in the drawings.

Filter

A filter according to the present embodiment includes a porous molded article, which is a sintered material of mixed powder containing activated carbon powder and thermoplastic resin powder.

In the filter according to the present embodiment, when water having a specific electrical resistance value of 18 MΩ·cm or more is caused to pass through the filter according to the embodiment at a space velocity of 1200 hr$^{-1}$, a specific electrical resistance value of the water after being caused to pass through the filter be 13 MΩ·cm or greater. Note that it is only necessary that the water before being caused to pass through the filter have a specific electrical resistance value of 18 MΩ·cm or greater. The water before being caused to pass through the filter may have a specific electrical resistance value of a theoretical limit value of approximately 18.23 MΩ·cm. Further, an upper limit of the specific electrical resistance value of the water after being caused to pass through the filter is not particularly limited. For example, the upper limit may be equal to or less than a specific electrical resistance value of the water before being caused to pass through the filter.

Note that, in this specification, the specific electrical resistance value of water shows a value that is measured with In-line Resistivity Sensor ERF-001-C-T available from HORIBA, Ltd.

According to the above filter, by removing metal ions in a treatment liquid, a solution having an extremely low metal ion content can be easily obtained from the treatment liquid containing metal ions.

In the present embodiment, the above sintered material may have strength capable of free standing, and particles of the thermoplastic resin powder may be fused together and fixed.

In the present embodiment, the activated carbon powder is obtained by converting activated carbon into a powdered form. The activated carbon can be obtained by reacting activated carbon raw materials such as wood, bamboo, coconut husks, rice hulls, bituminous coal (coal), lignite (brown coal), peat coal (peat), olive seed, rayon, acrylonitrile, coal pitch, petroleum pitch, phenol resin, and the like, at elevated temperatures using water vapor, chemicals, or the like to be made porous.

The activated carbon powder may contain carbon as a main component. The activated carbon powder may further contain oxygen, hydrogen, calcium, and the like other than carbon. Here, the main component indicates that the content is 50 mass % or greater (preferably 80 mass % or greater and more preferably 90 mass % or greater).

For example, an average particle diameter $d_2$ of the activated carbon powder may be 1 μm or greater or may be 10 μm or less. Further, for example, the average particle diameter $d_2$ of the activated carbon powder may be 1000 μm or less, preferably 500 μm or less, and more preferably 100 μm or less. Since the surface area of the activated carbon in the porous molded article is increased by reducing the average particle diameter $d_2$ of the activated carbon powder, metal ions in the treatment liquid can be removed more efficiently. In addition, since the filter is easily affected by cleaning or the like by reducing the average particle diameter $d_2$ of the activated carbon powder, it becomes easier to obtain a filter that satisfies the requirements of the specific electrical resistance value described above.

The average particle diameter $d_2$ of the activated carbon powder indicates a value of D50 calculated by a laser diffraction and scattering method in accordance with JIS Z 8825: 2013. More specifically, particle diameter distribution of the activated carbon powder is calculated by the laser diffraction and scattering method using Mastersizer 3000 available from Malvern Panalytical Ltd (Worcestershire, United Kingdom). Particle sizes are integrated in ascending order from a particle diameter having the smallest number of particles among all the particle diameters. Then, D50, which corresponds to 50%, is used as the average particle diameter $d_2$.

The specific surface area of the activated carbon powder may be, for example, 100 m$^2$/g or greater and is preferably 500 m$^2$/g or greater. Furthermore, the specific surface area of the activated carbon powder may be, for example, 5000 m$^2$/g or less or may be 2500 m$^2$/g or less. By increasing the specific surface area of the activated carbon powder, metal ions in the treatment liquid can be removed more efficiently. Note that the specific surface area of the activated carbon powder indicates the value measured by the BET method (also called the BET specific surface area).

In the embodiment, the thermoplastic resin powder is powder made of a resin material containing a thermoplastic resin as a main component. Particles of the thermoplastic resin powder are partly fused together through sintering, and can thereby form a porous structure.

A content of the thermoplastic resin in the thermoplastic resin powder is preferably 80 mass % or greater, more preferably 90 mass % or greater, and even more preferably 95 mass % or greater, based on the total mass of the thermoplastic resin powder.

The thermoplastic resin powder may further contain another component different from a thermoplastic resin. Examples of such another component include a plasticizer such as stearate, talc, silica, and an antioxidant.

It is preferred that the thermoplastic resin powder include, as the thermoplastic resin, at least one type selected from the group consisting of ultra-high molecular weight polyethylene, polyamide, fluororesin, and acrylic resin.

As the ultra-high molecular weight polyethylene, ultra-high molecular weight polyethylene having a weight-average molecular weight of $7.5 \times 10^5$ g/mol or greater and $5 \times 10^7$ g/mol or less is preferred, and ultra-high molecular weight polyethylene having a weight-average molecular weight of $1.0 \times 10^6$ g/mol or greater and $1.2 \times 10^7$ g/mol or less is more preferred. Note that the weight-average molecular weight of the ultra-high molecular weight polyethylene shows a value that is measured with the methods below.

1. "Standard Test Method for Dilute Solution Viscosity of Ethylene Polymers," D1601, Annual Book of ASTM Standards, American Society for Testing and Materials.

2. "Standard Specification for Ultra-High-Molecular-Weight Polyethylene Molding and Extrusion Materials," D4020, Annual Book of ASTM Standards, American Society for Testing and Materials A melting point of the ultra-high molecular weight polyethylene is not particularly limited. For example, the melting point of the ultra-high molecular weight polyethylene may be from 130° C. to 135° C. Further, a melt index of the ultra-high molecular weight polyethylene is preferably 1.0 g/10 min (ASTM D1238 (ISO 1133), 190° C., load of 21.6 kg) or less, and more preferably 0.5 g/10 min or less.

As the polyamide, for example, semicrystalline polyamide fine particles having a melting point of 150° C. or higher and 200° C. or lower can be preferably used. Further, as such polyamide, polyamide having an average number of carbon atoms per monomeric unit of 10 or more is preferred.

An average particle diameter $d_1$ of the thermoplastic resin powder is not particularly limited. For example, the average particle diameter of the thermoplastic resin powder may be 0.5 μm or greater or may be 1 μm or greater. Further, for example, the average particle diameter $d_1$ of the thermoplastic resin powder may be 500 μm or less or may be 100 μm or less. There is a tendency that increasing the average particle diameter of the thermoplastic resin powder increases voids of the porous molded article to enhance liquid permeability. There is a tendency that reducing the average particle diameter of the thermoplastic resin powder causes the porous molded article to be denser to enhance strength even more. Note that the average particle diameter $d_1$ of the thermoplastic resin powder can be measured by the same method as the measurement method for the average particle diameter $d_2$ of the activated carbon powder.

It is preferred that the thermoplastic resin powder be aspherical resin powder. For example, the thermoplastic resin powder may have a shape that microsphere particles are agglomerated into a shape of a bunch of grapes, or may have a "kompeito"-like shape that a plurality of protrusions are formed on spherical particles. According to the aspherical thermoplastic resin powder, tolerance to dimensional change at the time of swelling tends to be enhanced even more.

It is preferred that the thermoplastic resin powder be porous powder. For example, bulk density of the porous thermoplastic resin powder may be from 0.1 to 0.7 g/cm$^3$, or may be from 0.2 to 0.6 g/cm$^3$. Note that, in this specification, the bulk density of the porous thermoplastic resin powder shows a value that is measured with a method in accordance with ISO 60.

A ratio $d_2/d_1$ of the average particle diameter $d_2$ of the activated carbon powder to the average particle diameter $d_1$ of the thermoplastic resin powder may be, for example, 0.1 or greater or may be 0.5 or greater. The ratio $d_2/d_1$ of the average particle diameter $d_2$ of the activated carbon powder to the average particle diameter $d_1$ of the thermoplastic resin powder may be, for example, 1000 or less, preferably 100 or less, and more preferably 10 or less. By reducing the ratio $d_2/d_1$ of the average particle diameter $d_2$ of the activated carbon powder to the average particle diameter $d_1$ of the thermoplastic resin powder, particles of the thermoplastic resin powder are more likely to be fused together, further improving uniformity, strength, and densification of the porous molded article. For this reason, strength of the porous molded article is further enhanced, and thus the porous molded article can be more preferably used as a filter capable of free standing.

In the present embodiment, the porous molded article is formed by sintering the mixed powder containing the activated carbon powder and the thermoplastic resin powder.

In one aspect of the porous molded article, it can be said that the porous molded article is formed by particles of activated carbon powder being dispersed and fixed in a porous structure formed by sintering of thermoplastic resin powder.

The content of the activated carbon powder in the mixed powder is preferably 10 parts by mass or more and more preferably 25 parts by mass or more, with respect to 100 parts by mass of the content of the thermoplastic resin powder. Further, the content of the activated carbon powder in the mixed powder is preferably 900 parts by mass or less and more preferably 300 parts by mass or less, with respect to 100 parts by mass of the content of the thermoplastic resin powder.

The mixed powder may further contain, as an additive, a component other than the activated carbon powder and the thermoplastic resin powder. For example, the mixed powder may further contain dried gel, a medium for reducing heavy metals, a medium for removing arsenic, an antimicrobial medium, an ion exchange medium, iodination, a resin, a fiber, a gas absorbing medium, or the like. A content of such an additive is preferably 20 mass % or less, and more preferably 5 mass % or less, based on the total mass of the mixed powder.

In the embodiment, the mixed powder is loaded into a die or the like according to a desired shape of a porous molded article, and is then sintered. Sintering of the mixed powder can be performed under a condition of causing the thermoplastic resin powder to be fused.

For example, a sintering temperature can be set to a temperature equal to or higher than a melting point of the thermoplastic resin in the thermoplastic resin powder. For example, the sintering temperature may be 140° C. or higher, and is preferably 150° C. or higher. Further, for example, the sintering temperature may be 200° C. or lower, or may be 180° C. or lower.

A period of time of sintering is not particularly limited. For example, the period of time of sintering can be set to from 5 minutes to 120 minutes, and may be from 10 minutes to 60 minutes.

The porous molded article can be formed into various shapes, by appropriately selecting a die into which the mixed powder is loaded at the time of sintering. For example, the porous molded article can be formed into various shapes, such as a disk-like shape, a hollow cylindrical shape, a bell-like shape, a conical shape, and a hollow star-like shape.

For example, a thickness of the porous molded article may be 0.2 mm or greater, and is preferably 1 mm or greater, and more preferably 5 mm or greater. Further, for example, the thickness of the porous molded article may be 1000 mm or less, and is preferably 100 mm or less.

The porous molded article may be a sintered material of mixed powder.

The filter according to the embodiment includes the above porous molded article. The filter according to the embodiment may be a filter formed of the porous molded article, or may further include another member or the like as long as the filter can thoroughly remove metal ions.

A shape of the filter according to the embodiment is not particularly limited. For example, the shape of the filter according to the embodiment may be a shape such as a cylindrical shape, a prism shape, a plate-like shape, a bell-like shape, a spherical shape, a semi-spherical shape, and a cuboid shape, and these shapes may be hollow.

Regarding the filter according to the present embodiment, as described above, when water having a specific electrical resistance value of 18 MΩ·cm or greater is caused to pass through the filter at a space velocity of 1200 hr$^{-1}$, a specific electrical resistance value of the water after being caused to pass through the filter be 13 MΩ·cm or greater.

A method of obtaining such a filter is not particularly limited. Examples of the method of obtaining such a filter include a method in which a cleaning liquid is caused to flow through the above porous molded article to clean the above porous molded article. As the cleaning liquid, for example, water, an organic solvent, an acidic solution, an alkaline solution, a mixed liquid of these, or the like can be used. A cleaning condition is not particularly limited. For example, a flow rate at the time of cleaning may be from 10 mL/min to 10 L/min, and a space velocity at the time of cleaning may be from 6 to 6000 hr$^{-1}$. Further, for example, a temperature of the cleaning liquid at the time of cleaning may be from 1° C. to 99° C.

Removal Method of Metal Ions

A removal method of metal ions according to the embodiment is a method of removing metal ions in a treatment liquid, and includes a liquid-passing step of causing a treatment liquid to pass through the filter described above.

According to the removal method of the embodiment, metal ions (such as Na ions, Fe ions, K ions, Ca ions, Co ions, Cr ions, and Ni ions, in particular) can be efficiently removed, and thus a liquid having an extremely low metal ion content (e.g., a liquid having a content of each of the metal ions of 500 ppt or less, more preferably 150 ppt or less, and still more preferably 100 ppt or less) can be obtained. According to the removal method of the embodiment, in addition to metal ions, halide ions (in particular, Cl ions, Br ions, I ions) can be efficiently removed, and thus a liquid having an extremely low halide ion content (e.g., a liquid having a content of each of the halide ions of 1 ppm or less, more preferably 0.1 ppm or less, and still more preferably 0.01 ppm or less) can be obtained.

In the embodiment, the content of metal ions in a treatment liquid is not particularly limited. For example, the content of metal ions in a treatment liquid may be 1 ppb or greater, or may be 100 ppb or greater. An upper limit of the content of metal ions in a treatment liquid is not particularly limited. For example, the upper limit of the content of metal ions in a treatment liquid may be 100 ppm or less, or may be 1000 ppb or less.

The treatment liquid may be a water-based solvent such as water, an organic solvent such as PGMEA, or a mixed liquid of these.

A condition when a treatment liquid is caused to pass through the filter is not particularly limited. For example, a space velocity (SV) may be from 6 to 200 $hr^{-1}$. Further, for example, a primary pressure may be from 20 to 300 kPa.

The treatment liquid may further contain an organic compound. In other words, in the embodiment, metal ions can also be removed from a solution obtained by dissolving an organic compound in a solvent. Further, in the embodiment, metal ions can also be removed after an additive is added to a treatment liquid.

In the embodiment, the treatment liquid may be a liquid that has passed through another filter. In other words, the liquid-passing step may be a step including a first liquid-passing step of causing a treatment liquid to pass through a first filter, and a second liquid-passing step of causing the treatment liquid, which has been subjected to the first liquid-passing step, to pass through a second filter. In this case, the filter described above is used as the second filter, and the first filter is not particularly limited.

In one preferred aspect, the above first filter may be a filter including a porous molded article that is a sintered material of mixed powder containing activated carbon powder and thermoplastic resin powder.

As an exemplary example of the first filter of the aspect, a filter similar to the filter according to the above embodiment may be given. Note that, regarding the first filter, when water having a specific electrical resistance value of 18 MΩ·cm or greater is caused to pass through the first filter at a space velocity of 1200 $hr^{-1}$, the specific electrical resistance value of the water after being caused to pass through the first filter need not be 13 MΩ·cm or greater.

Metal Ion Removal Device

A metal ion removal device according to the embodiment includes a removal unit including the filter according to the above embodiment.

Figure 2:
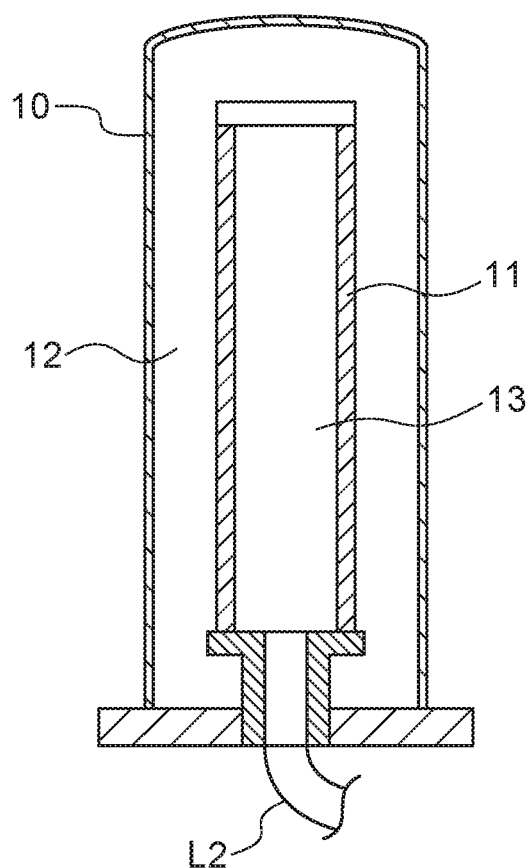
FIG. 2 is a diagram illustrating a cross-sectional plane taken along the line II-II of FIG. 1.

FIG. 1 is a diagram for describing one preferred mode of a metal ion removal device. FIG. 2 is a diagram illustrating a cross-section taken along the line II-II of FIG. 1. A metal ion removal device 100 illustrated in FIG. 1 includes a removal unit 10 including a filter 11 according to the above embodiment, a first tank 20 that stores a treatment liquid 21, and a second tank 30 that stores a liquid 31 after metal ion removal. Further, the inside of the removal unit 10 is divided into a first area 12 and a second area 13 by the filter 11.

The first tank 20 and the removal unit 10 are coupled together with a first line L1. The treatment liquid 21 in the first tank 20 passes through the first line L1 to be supplied to the first area 12 of the removal unit 10. The treatment liquid 21 that has been supplied to the first area 12 passes through the filter 11 to be transferred to the second area 13. At this time, metal ions in the treatment liquid 21 are removed by the filter 11. The second tank 30 and the removal unit 10 are coupled together with a second line L2. The treatment liquid (liquid 31) that has passed through the filter 11 passes through the second line L2, thus being supplied from the second area 13 to the second tank 30.

Figure 3:
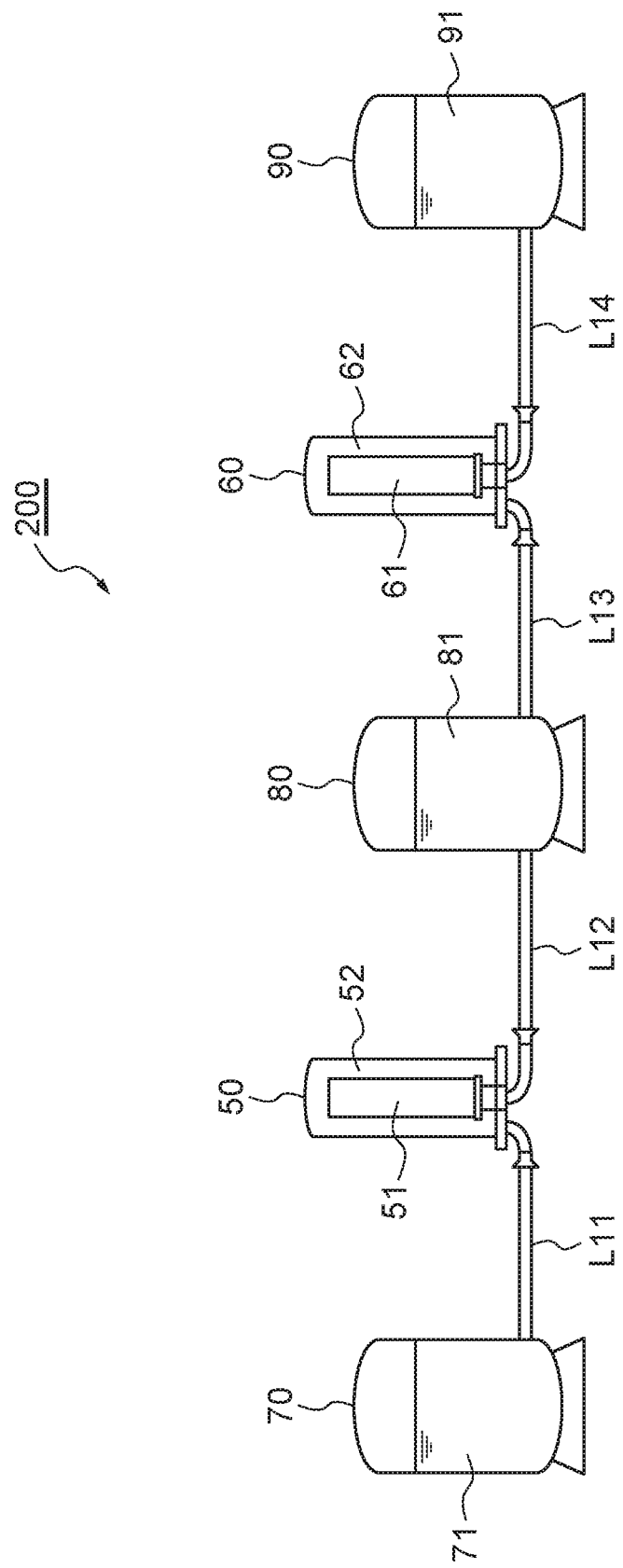
FIG. 3 is a diagram illustrating another embodiment of a metal ion removal device.

FIG. 3 is a diagram for describing another preferred mode of a metal ion removal device. A metal ion removal device 200 illustrated in FIG. 3 includes a first removal unit 50 including a first filter 51, a second removal unit 60 including a second filter 61, a first tank 70 that stores a treatment liquid 71, a second tank 80 that stores an intermediate liquid 81 that has passed through the first filter 51, and a third tank 90 that stores a liquid 91 that has passed through the second filter 61 to have its metal ions removed. The second filter 61 is the filter according to the above embodiment.

The first tank 70 and the first removal unit 50 are coupled together with a first line L11. The treatment liquid 71 in the first tank 70 passes through the first line L11 to be supplied to the first removal unit 50. The treatment liquid 71 that has been supplied to the first removal unit 50 is caused to pass through the first filter 51. The first removal unit 50 is coupled to the second tank 80 with a second line L12. The intermediate liquid 81 that has passed through the first filter 51 passes through the second line L12 to be supplied to the second tank 80.

The second tank 80 and the second removal unit 60 are coupled together with a third line L13. The intermediate liquid 81 in the second tank 80 passes through the third line L13 to be supplied to the second removal unit 60. The intermediate liquid 81 that has been supplied to the second removal unit 60 is caused to pass through the second filter 61. The second removal unit 60 is coupled to the third tank 90 with a fourth line L14. The liquid 91 that has passed through the second filter 61 to have its metal ions removed passes through the fourth line L14 to be supplied to the third tank 90.

In one preferred aspect, the above first filter 51 may be a filter including a porous molded article, which is a sintered material of mixed powder containing activated carbon powder and thermoplastic resin powder.

As an exemplary example of the first filter 51 of this aspect, a filter similar to the filter according to the above embodiment may be given. Note that, regarding the first filter 51, when water having a specific electrical resistance value of 18 MΩ·cm or greater is caused to pass through the first filter at a space velocity of 1200 $hr^{-1}$, the specific electrical resistance value of the water after being caused to pass through the first filter need not be 13 MΩ·cm or greater.

Although descriptions were given above for the preferred embodiments of the present invention, the present invention is not limited to the aforementioned embodiments.

EXAMPLES

The present invention will be described more specifically below using examples, but the present invention is not intended to be limited to the examples.

Example 1

Activated Carbon Powder 1

As the activated carbon powder, the trade name "ACTI-CARBONE ENO-PC" (BET specific surface area: 1400 m²/g, average particle diameter: $d_2$: 25 μm) was used.

Thermoplastic Resin Powder 1

As thermoplastic resin powder, trade name "GUR 2126" (ultra-high molecular weight polyethylene powder, weight-average molecular weight: approximately $4.5 \times 10^6$ g/mol, average particle diameter $d_1$: 32 μm) available from Celanese Corporation (Oberhausen, Germany) was used.

Manufacturing of Filter

The activated carbon powder 1 (50 parts by mass) and the thermoplastic resin powder 1 (50 parts by mass) were mixed together. The mixture was loaded into a die and was then heated in an oven at 160° C. for 10 minutes. In this manner, a hollow cylindrical filter having an outer diameter of approximately 60 mm, an inner diameter of approximately 28 mm, and a length of approximately 250 mm was manufactured. An opening portion of the manufactured filter on one side was closed, so that a treatment liquid flowed into the inside of the filter from the outside. The manufactured filter was treated with a cleaning liquid for 48 hours or more. In this manner, a filter 1 in Example 1 was obtained.

Water having a specific electrical resistance value of 18 MΩ·cm was caused to pass through the obtained filter 1 at a space velocity of 1200 hr⁻¹. The specific electrical resistance value of the water after being caused to pass through the filter; and the chloride ion content and the metal ion content were measured. The results are shown in Table 1.

Comparative Example 1

A filter 2 was produced in the same manner as in Example 1 with the exception that treatment with the cleaning liquid was not performed.

Water having a specific electrical resistance value of 18 MΩ·cm was caused to pass through the obtained filter 2 at a space velocity of 1200 hr⁻¹. The specific electrical resistance value of the water after being caused to pass through the filter; and the chloride ion content and the metal ion content were measured. The results are shown in Table 1.

TABLE 1

|  | Specific Electrical Resistance Value (MΩ · cm) | Chloride Ion Content (ppb) | Metal Ion Content (ppb) |
| --- | --- | --- | --- |
| Example 1 | 15.0 | 0 | 0.1 |
| Comparative Example 1 | 6.2 | 10 | 3.6 |

REFERENCE SIGNS LIST

10: Removal unit, 11: Filter, 20: First tank, 30: Second tank, 100: Metal ion removal device, 50: First removal unit, 51: First filter, 60: Second removal unit, 61: Second filter, 70: First tank, 80: Second tank, 90: Third tank, 200: Metal ion removal device.

What is claimed is:

1. A filter for the removal of metal ions in a treatment liquid, said filter comprising:
    a porous molded article, the porous molded article being a sintered material formed by sintering mixed powder consisting essentially of activated carbon powder and thermoplastic resin powder, wherein;
    an average particle diameter of the activated carbon powder is 1 μm to 25 μm, and a ratio $d_2/d_1$ of an average particle diameter $d_2$ of the activated carbon powder to an average particle diameter $d_1$ of the thermoplastic resin powder is 10 or less;
    the content of the activated carbon powder in the mixed powder is 300 parts by mass or more and 900 parts by mass or less, with respect to 100 parts by mass of the content of the thermoplastic resin powder; and
    when water having a specific electrical resistance value of 18 MΩ·cm or greater is caused to pass through the filter at a space velocity of 1200 hr⁻¹, a specific electrical resistance value of the water after being caused to pass through the filter is 13 MΩ·cm or greater.

2. The filter according to claim 1, wherein a ratio $d_2/d_1$ of an average particle diameter $d_2$ of the activated carbon powder to an average particle diameter $d_1$ of the thermoplastic resin powder is 0.1 or greater.

3. The filter according to claim 1, wherein the ratio $d_2/d_1$ of an average particle diameter $d_2$ of the activated carbon powder to an average particle diameter $d_1$ of the thermoplastic resin powder is 0.5 or greater.

4. A removal method of metal ions in a treatment liquid, the removal method comprising
    a liquid-passing step of causing the treatment liquid to pass through the filter described in claim 1.

5. The removal method according to claim 4, wherein the liquid-passing step includes:
    a first liquid-passing step of causing the treatment liquid to pass through a first filter; and
    a second liquid-passing step of causing the treatment liquid that has been subjected to the first liquid-passing step to pass through a second filter, and
    the second filter is the filter described in claim 1.

6. The removal method according to claim 5, wherein the first filter includes a porous molded article, the porous molded article being a sintered material of mixed powder containing activated carbon powder and thermoplastic resin powder.

7. A metal ion removal device comprising:
    a first filter; and
    a second filter configured to remove metal ions from a treatment liquid that has passed through the first filter, wherein
    the second filter is the filter described in claim 1.

8. The metal ion removal device according to claim 7, wherein the first filter includes a porous molded article, the porous molded article being a sintered material of mixed powder containing activated carbon powder and thermoplastic resin powder.

* * * * *